(12) United States Patent
Allen

(10) Patent No.: US 6,470,579 B2
(45) Date of Patent: Oct. 29, 2002

(54) POSITION AND ANGLE INDICATING TOOL

(76) Inventor: Harold Allen, P.O. Box 23, Fawnskin, CA (US) 92333

( * ) Notice: Subject to any disclaimer, the term of this patent is extended or adjusted under 35 U.S.C. 154(b) by 38 days.

(21) Appl. No.: 09/746,283

(22) Filed: Dec. 22, 2000

(65) Prior Publication Data

US 2002/0078578 A1 Jun. 27, 2002

Related U.S. Application Data

(63) Continuation-in-part of application No. 09/358,505, filed on Jul. 21, 1999, now abandoned.

(51) Int. Cl.[7] ............................ G01C 15/00; G01C 9/00
(52) U.S. Cl. ...................................... 33/286; 33/DIG. 21
(58) Field of Search ....................... 33/227, 228, 275 R, 33/281, 282, 283, 285, 286, 404, 407, 613, 645, DIG. 21

(56) References Cited

U.S. PATENT DOCUMENTS

| | | | | |
|---|---|---|---|---|
| 3,828,443 A | * | 8/1974 | James | 33/1 LE |
| 3,897,637 A | * | 8/1975 | Genho | 33/227 |
| 4,703,563 A | * | 11/1987 | Hoshino et al. | 33/227 |
| 5,182,863 A | * | 2/1993 | Rando | 33/227 |
| 5,459,932 A | * | 10/1995 | Rando et al. | 33/291 |
| 5,495,675 A | * | 3/1996 | Huang | 124/87 |
| 5,566,459 A | * | 10/1996 | Breda | 33/290 |
| 5,575,073 A | * | 11/1996 | von Wedemayer | 33/285 |
| 5,604,987 A | * | 2/1997 | Cupp | 33/275 R |
| 5,819,424 A | * | 10/1998 | Ohtomo et al. | 33/227 |
| 5,842,282 A | * | 12/1998 | Ting | 33/227 |
| 5,864,956 A | * | 2/1999 | Dong | 33/227 |
| 6,247,238 B1 | * | 6/2001 | Harvey et al. | 33/286 |
| 6,256,895 B1 | * | 7/2001 | Akers | 33/286 |
| 6,332,276 B1 | * | 12/2001 | Mangel | 33/273 |

FOREIGN PATENT DOCUMENTS

GB          2076965 A  * 12/1981    ........... G01C/15/00

* cited by examiner

Primary Examiner—Diego Gutierrez
Assistant Examiner—Ryan T. Hayleck
(74) Attorney, Agent, or Firm—Gene Scott-Patent Law & Venture Group

(57) ABSTRACT

Position and angle are measured by a linear device having an elongate frame comprising a pair of parallel arms joined by a cross-arm, each of the arms terminating with an adjustable foot so that the device may be leveled, thereby establishing a level reference platform from which position and direction may be determined. A support bracket is adapted for rigid engagement with the elongate frame and is linearly positionable on it. A laser beam source is removably engageable with the support bracket for positioning a laser beam in a selected and known direction. The feet are spaced for clamping the T-bar sections of a dropped ceiling so as to enable the placement of further T-bars, roof joists and other structural members at selected angles. The arms provide parallel, spaced apart grooves for mounting the apparatus onto the T-bars.

19 Claims, 4 Drawing Sheets

POSITION AND ANGLE INDICATING TOOL

RELATED APPLICATIONS:

This is a continuation-in-part application of a prior filed and currently pending application having serial number 09/358,505 and file date of Jul. 21, 1999, which application describes and claims similar matter.

BACKGROUND OF THE INVENTION

1. Field of the Invention

This invention relates generally to level and position indicating devices for use in construction, and more particularly to a level and position indicating device adapted for use in ceiling and roof construction.

2. Description of Related Art

The following art defines the present state of this field:

Dong, U.S. Pat. No. 5,864,956 describes a combination of square alloy rulers with precisely machined planes, each ruler unit having two 1.5v batteries and two bubble levels to level in all directions. A line generator is mounted in front of a laser diode module. This basic laser line ruler unit can produce an accurate laser level line or plumb line after it is calibrated. By adjusting the calibrating knob, the laser line ruler will produce a precise level line or plumb line when the level bubbles are centered. Putting a properly aligned level line unit and a properly aligned plumb line unit together will produce a cross line in front of the combination. Adding at least one more laser line ruler, that is combining three or more line units, will produce 90 degree lines, 45 degree lines, and 180 degree lines, as well as 270 degree lines up and down or on the right and left sides by simply adjusting the position of the relevant ruler. The housing of the ruler position of the relevant ruler. The housing of the ruler unit is machined with accurate planes and vertical angles. Therefore, the combination of several rulers can project accurate level lines, vertical lines, 45 degree lines, 90 degree lines, etc. This simple, small, and unique ruler combination is affordable to the public and can be widely used in hardwood layout and cutting, carpet cutting, squaring the surfaces of any plane object, etc. in addition to its usage in construction.

Ting, U.S. Pat. No. 5,842,282 describes a laser angle adjustment device for laser measuring instruments including a rectangular casing, a fixed bubble level and an adjustable bubble level mounted on the casing at right angles, a barrel turned in a hole in the casing, a top cover fixedly fastened to the barrel at one end to hold a laser module for providing a laser reference line for measurement.

Ohtomo et al., U.S. Pat. No. 5,819,424 describes an invention providing a laser leveling device, which comprises a light emitting unit for irradiating a laser beam, a rotating unit for rotating the laser beam for scanning, and a means for turning off the scanning laser beam so that a spot-like is formed in a specific direction. By forming a reference spot light, and aligning an irradiating point of the spot beam with the reference point, it is possible to install the laser leveling device to the reference point and to perform accurate positioning of the laser leveling device by the scanning line of the laser beam formed on a portion other than the spot.

Cupp, U.S. Pat. No. 5,604,987 describes a support for a laser beam generator in a carpenter's level is positioned on the level so that the laser beam generated will lie in the plane of a flat reference surface of the level. A battery or other power supply is housed in the carpenter's level together with circuitry to connect the power supply to the laser beam generator and preferably a switch allowing the generator to be turned off and on. Gauges may be employed in the level for vertical, as well as horizontal may be included. Such a gauge may be a commercial gauge such as an inclinometer. Preferably, however, a conventional gauge employing an arcuate tube filled with liquid having a bubble in it which seeks the highest level of the tube with calibration marks for accurately positioning the bubble. Such a gauge rotatably supported, but frictionally held in a selected position relative to the level enables a selected angle for the reference surface to repeatedly be used even without calibration. With calibration, it enables a selected angle relative to horizontal to be set from the calibrations so that the reference surface may be oriented at the set angle when using the level.

Breda, U.S. Pat. No. 5,566,459 describes a laser beam device that performs sightings and tracings which make use of a calibrated tube inside which resides a laser emitting component of which the optical emitting axis coincides with the mechanical axis of the tube, a mirror securely mounted at the end of the tube and set at a 45 degree angle from the incident laser beam, an end piece mounted and rotating on the end of the tube which includes a number of ports which can be brought to be coaxially centered in the reflected beam by simply rotating the end piece and a number of optical systems respectively mounted in the ports. The device provides flexibility without requiring additional set-up.

Huang, U.S. Pat. No. 5,495,675 describes a laser sight including a mounting base fixed to the bow back of a bow, a first holder frame fastened to the mounting base and adjusted in the X-axis direction, a second holder frame fastened to the first holder frame and adjusted in the Y-axis direction, a third holder frame fastened to the second holder frame and adjusted in the Z-axis direction and having a sight blade, and a laser module fastened to a swivel laser module holder on the third holder frame, wherein the swivel laser module holder is fastened to the third holder frame by an adjustment screw and can be turned about the adjustment screw to adjust the angle of inclination of the laser module for allowing the laser beam from the laser module to be aimed at a target when the sight blade is aligned with the target.

Rando et al., U.S. Pat. No. 5,459,932 describes an automatic plumb, level and pointing tool uses a visible laser diode to project light beams in two modes through two windows, In the first mode of operation, the unit is able to project a plumb-up beam and a level beam of light while resting on a surface which is as much as five degrees out of level. In the second mode of operation the unit is able to project two orthogonal beams of light both approximately in the horizontal plane for aligning one or more reference lines. An accurate, low cost method of generating level and plumb beams and planes of light is disclosed. One method uses an approximately leveled platform combined with a weak optical correction. The approximate leveling is done using a single wire or coil spring pendulum element which allows the platform to level itself to within a small fraction of true level, and remaining correction is provided by a weak negative lens or a weak reverse telescope. In alternative embodiments, all leveling is accomplished using a very flexible coil spring as a pendulum element, or a chain-link connection in combination with such a spring. Several accessories are disclosed for use with the laser tool.

Rando, U.S. Pat. No. 5,182,863 describes an automatic plumb, level, pointing and distance measuring tool uses a visible laser diode to project a beam in any of several different modes through a beam exit window. The tool, approximately the size and shape of a tape measure, can be placed on the edge to project a tilt-compensated vertical beam. Placed on another edge 90 degree rotated, the tool projects through the same exit window a tilt-compensated vertical beam. When laid on either of its larger flat sides, the tilt compensation becomes inoperative and the tool projects a beam, which is fixed relative to the housing. Acoustic distance measurement is facilitated using a second component or target side device, which is activated to send an acoustic signal across a space to be measured, toward the laser tool. A receiver in the laser tool detects arrival of the acoustic signal and causes the laser to project a characteristically modulated or pulsed beam, received at a photo-detector on the target side device. The acoustic transit time is clocked and distance is calculated and displayed. The use of a single acoustic transit time, without reflection increases distance-measuring range. Also, the visible laser beam projected between the two components provides a clear visual indication of the distance to be measured.

Genho, U.S. Pat. No. 3,897,637 describes a building level having a laser providing two and three beams simultaneously at 90 degrees to each other, and means for leveling and aligning the unit, and means for rotating the unit 90 degrees to provide grade and vertical.

The prior art teaches the construction and use of construction levels including those employing laser pointers. However, the prior art does not teach an apparatus that is enabled for mounting between the tee bars of a dropped ceiling so as to enable leveling of the ceiling and of a roof construction above the ceiling. The present invention fulfills these needs and provides further related advantages as described in the following summary.

SUMMARY OF THE INVENTION

The present invention teaches certain benefits in construction and use which give rise to the objectives described below.

The present invention provides a leveling and position indicating apparatus comprising an elongate frame with a pair of arms joined at a right angles, each of the arms terminating with an adjustable foot so that the device may be leveled, thereby establishing a level reference platform from which position and direction may be determined. A support bracket is adapted for rigid engagement with the elongate frame and is alternately positionable on it. A laser beam source is removably engagable with the support bracket for positioning a laser beam in a selected and measured direction relative to the reference platform. The feet are spaced for clamping onto the T-bar sections of a dropped ceiling so as to enable the placement of further T-bars, roof joists and other structural members at selected angles. The arms provide parallel, spaced apart grooves for mounting the apparatus onto the T-bars.

A primary objective of the present invention is to provide a leveling and position indicating apparatus having advantages not taught by the prior art.

Another objective is to provide such an apparatus enabled for clamping to a standard spacing between T-bars of a dropped ceiling so as to eliminate the need for using a plumb bob.

A further objective is to provide such an apparatus enabled for positioning a laser beam at a selected angle relative to a reference plane determined by the apparatus through adjustable feet.

A still further objective is to provide such an apparatus enabled for positioning the laser beam at any angle over a full circle.

A yet further objective is to provide such an apparatus enabled for being hooked over a joist, beam, or other fixed object when not in use, wherein a hook is provided at right angles for 90 degree mount to an adjacent surface and for preventing a fall from a ladder.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
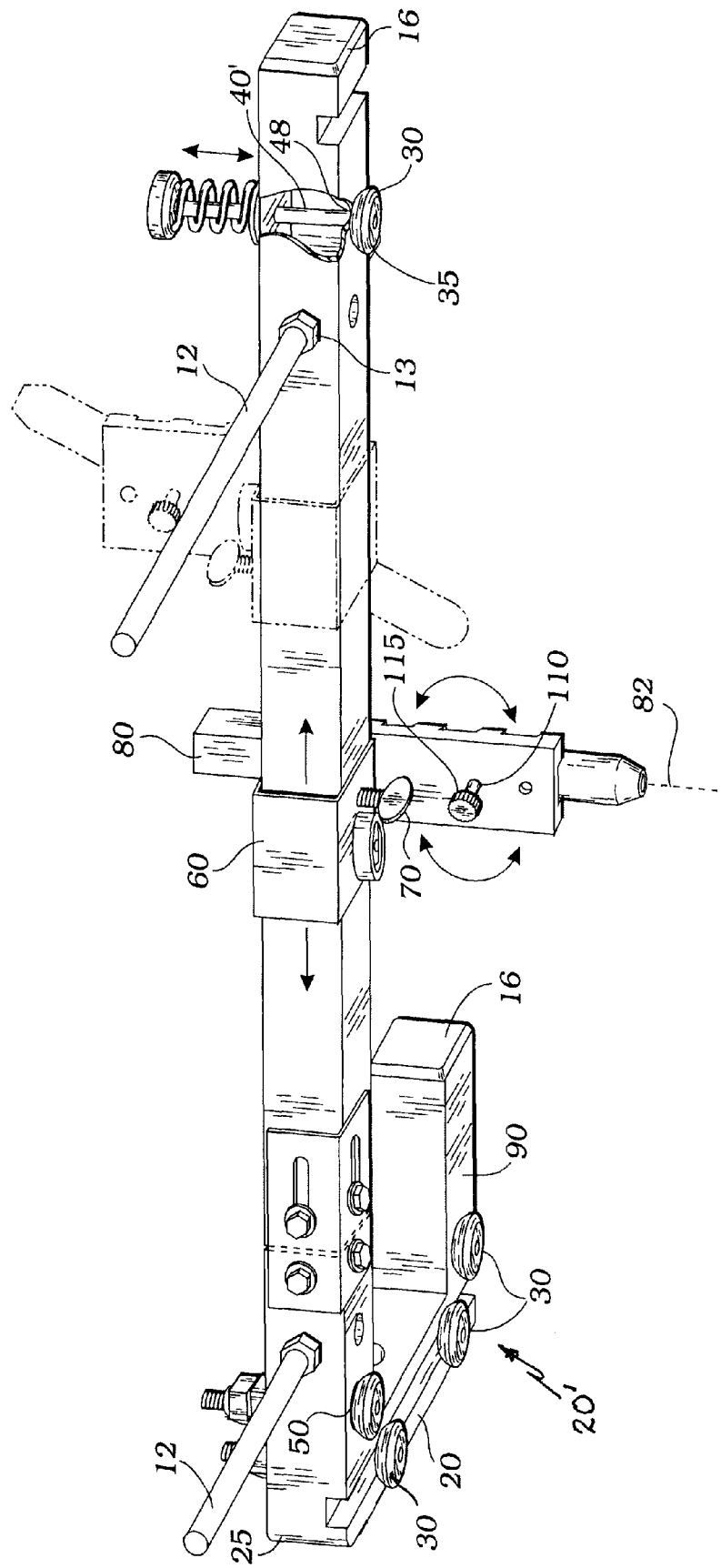
FIG. 1 is a perspective view of the preferred embodiment of the present invention shown supporting a laser indicating device.

The present invention is an apparatus, as shown in the drawing figures, for indicating position and angle for construction needs. It comprises a pair of legs, a long leg 10 and a cross leg 20, joined at a right angle, each of the legs terminating at a free end 10' and 20' respectively. Interconnected with, and depending from, the long leg 10 and cross leg 20 is a set of feet 30. One of the feet 30 is positioned at the intersection 25 of the pair of legs 10, 20. Another of the feet 30 is positioned near the free end 10' of the long leg 10, and the third is positioned at the free end 20' of the cross leg 20. These feet 30 allow the apparatus to be placed on a near level or near plumb surface (not shown) with the longitudinal axis of each of the pair of legs 10, 20 defining a plane which may be leveled through positional height adjustment of the feet 30, i.e., through screw height adjustment. This positional adjustment is accomplished by rotation of threaded shafts 40 that are engaged with cross leg 20 and which are free to turn in threaded holes 50 in arm 20 at the mounting points. Rotation of the adjustable foot 30 and integral threaded shaft 40 moves the foot 30 toward or away from the leg 20 in a direction that is perpendicular to the leg 20 as required to adjust the attitude of the apparatus in the level or plumb plane. Nuts 17 and 18 enable the threaded shaft 40 to be locked in place when foot 30 is properly adjusted.

Mounted upon the longer leg 10 is a support bracket 60 that is free to slide along the longer leg 10 as is shown by the arrows in FIG. 1, to any position along longer leg 10. This support bracket 60 is equipped with a clamp screw 70 that may be loosened to slide the bracket 60 linearly along the leg or tightened for rigid engagement of the support bracket 60 on the leg. Clearly, any number of other attachment means may be used for the same purpose in the present invention within the spirit of what is claimed. Attached to the support bracket 60 is a laser beam source 80 that may be removed, repositioned, or reattached to the support bracket 60 through receiver 61 for directing its laser beam 82 in any desired direction and such laser beam is therefore used to identify a selected angle in space for construction utility. Thus, one might establish a laser line for accurately defining the position of a joint or roof rafter, etc.

Figure 5:
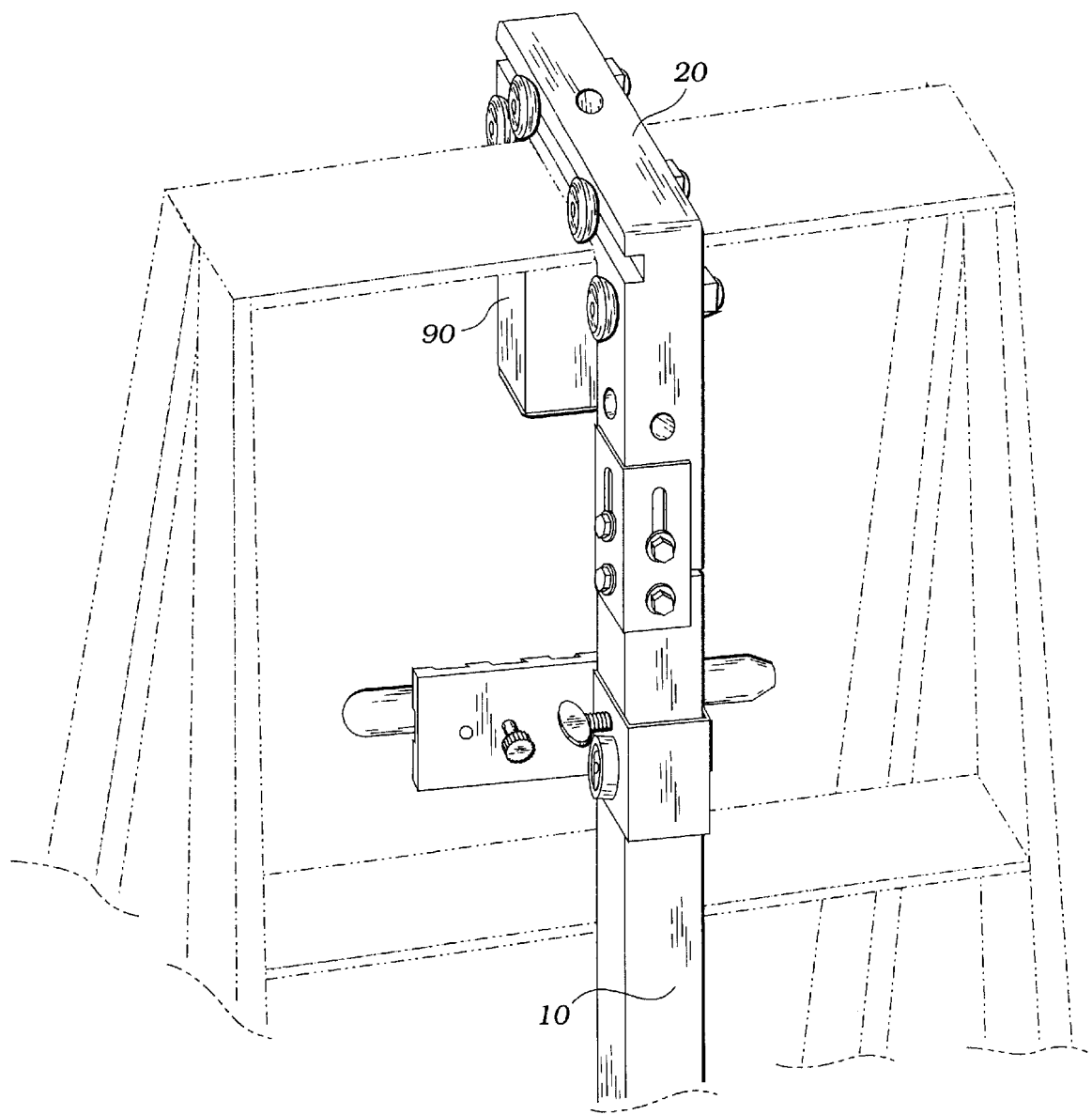
FIG. 5 is a perspective view showing a manner of resting the invention when not in use.

An additional short leg 90 is inventively connected to the cross arm 20 at its terminal end 20', and extends therefrom in parallel to leg 10 and spaced apart therefrom, as shown in FIG. 1. This short leg 90 permits the apparatus to be hung on horizontal surfaces such as beams, joists, ladder steps or other fixtures that are convenient at any work location as shown in FIG. 5. This enables a worker to free-up both hands for assuring his/her balance on a ladder or scaffold when working and to place the apparatus in a location where it is safe from falling. The apparatus is, therefore, also able to be securely hung on a peg, etc. for storage. Caps 16 are placed at the ends of legs 10 and 90 to enclose the preferred tubular construction.

Figure 3:
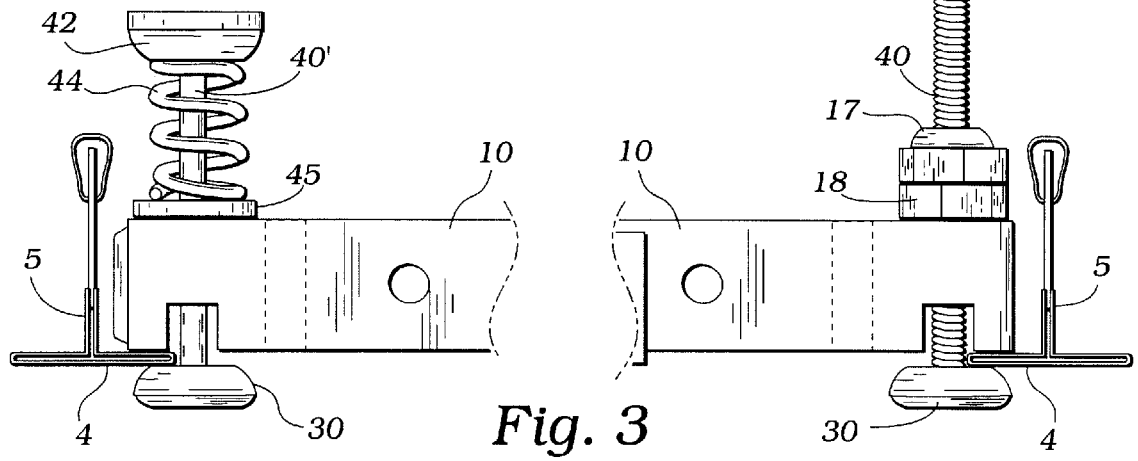
FIGS. 3 and 4 are side elevational views of the present invention as clamped to a pair of spaced-apart T-bars of a dropped ceiling in two differing manners.
Figure 4:
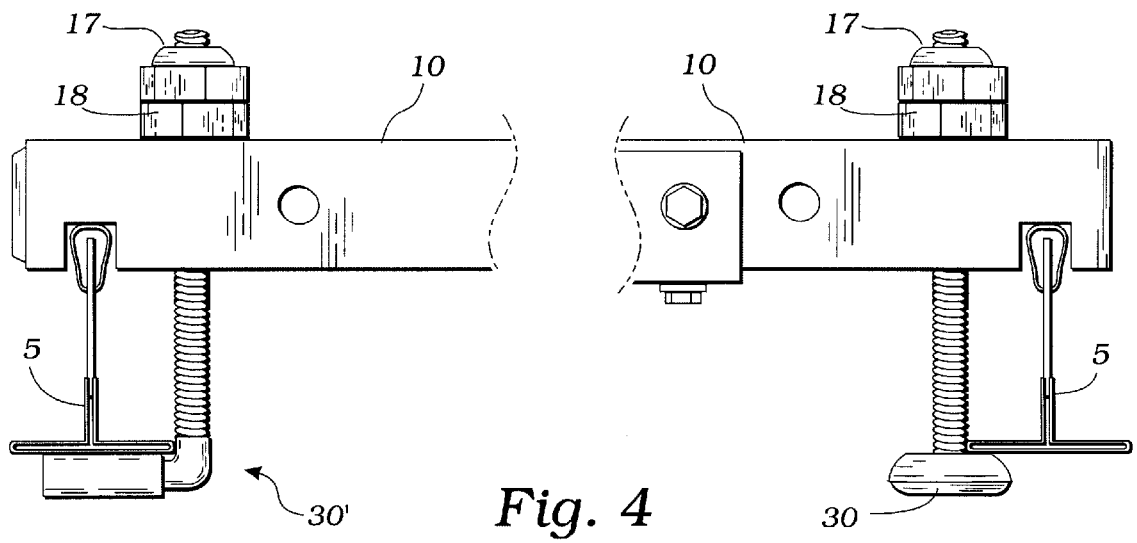

Preferably, the adjustable feet 30 are made of rubber or are covered with rubber for improved frictional contact to prevent the apparatus from sliding when placed on a surface with foot surface 35 in contact therewith. As shown in FIG. 3, each of the feet 30 may engage a flange 4 of a dropped ceiling T-bar 5 by clamping the flange 4 between one or two of the feet 30 and a surface of one of the legs 10, 20. At least two of the feet 30 are positioned apart at a distance necessary for clamping a pair of adjacent and parallel T-bars 5 of a dropped ceiling T-bar matrix, such matrices being very well known in the art and in common practice, so as to enable the invention to be used with such standard construction hardware used in standard dropped ceiling constructions. The foot 30 at the terminal end 10' of leg 10 is mounted on a smooth shaft 40' which, in turn, is mounted through clearance holes 48 in leg 10 so as to enable it to slide therewithin. A spring 44 is engaged as shown in FIG. 3 to provide a clamping force between leg 30 and the leg surface. Thusly, this foot 30 is easily clamped onto flange 4 by pressing down on pressing element 42 to open the space between foot 30 and the leg's surface, and then releasing pressing element 42 to allow spring 44 to draw foot 30 and the leg's surface toward each other to complete the clamping action desired. To provide clamping action with the other feet 30 mounted, rotation of the feet 30 is required so as to draw these feet 30 upward toward the surface to be clamped for appropriate clamping action. One of the feet 30' may comprise an "L" shaped structure with rubber tube at one end for manual tightening as shown in FIG. 4.

The present apparatus further comprises one or snore level sensing instruments or gauges, such as bubble levels, lasers, etc, that are mounted in and held rigidly in the one or more of legs 10, 20, and 90 of the frame and may be positioned on any of the surfaces of these legs. These level sensing instruments or gauges provide a visual display or indication to confirm when the frame has assumed the level or plunb attitude and is oriented properly with respect to a desired level or plumb plane. The laser beam source 80 is mounted to the support bracket 60 by a screw passing through the bracket 60 and engaging the body of the laser beam source 80. Receiver 61 is able to be set at selected angles so that the laser beam source 80 may be positioned at these angles, preferably in cruciform and the intermediary 45 degree angular directions thereof.

The apparatus is advantageously provided with two linear rods 12 extending in parallel laterally from one of the arms and attached thereto by threaded engagements, for instance, and locked in place by locking nuts 13. In FIG. 1, these rods extend from arm 10 for, in general, positioning the apparatus at a position set apart relative to a surface and parallel thereto. For instance if it is desired to position the apparatus in parallel with one of the T-bars 5 and spaced a selected distance therefrom, the rods 12 enable this placement to be made without further measurements.

The present invention may be fabricated in different sizes from light gauge metal tubing and with conventional fastener hardware and rubber feet 30, however, other manufacturing materials and techniques may be utilized to produce an apparatus that can meet the same desired functional objectives. These techniques may include the use of non-conductive plastics or composite materials, special corrosion resistant metals, extrusions and molding processes with machined or embedded metal or plastic threaded fittings. Though the construction of the invented apparatus may vary to accommodate different market requirements, the objectives of measuring position and angle are accomplished in the same manner.

Figure 2:
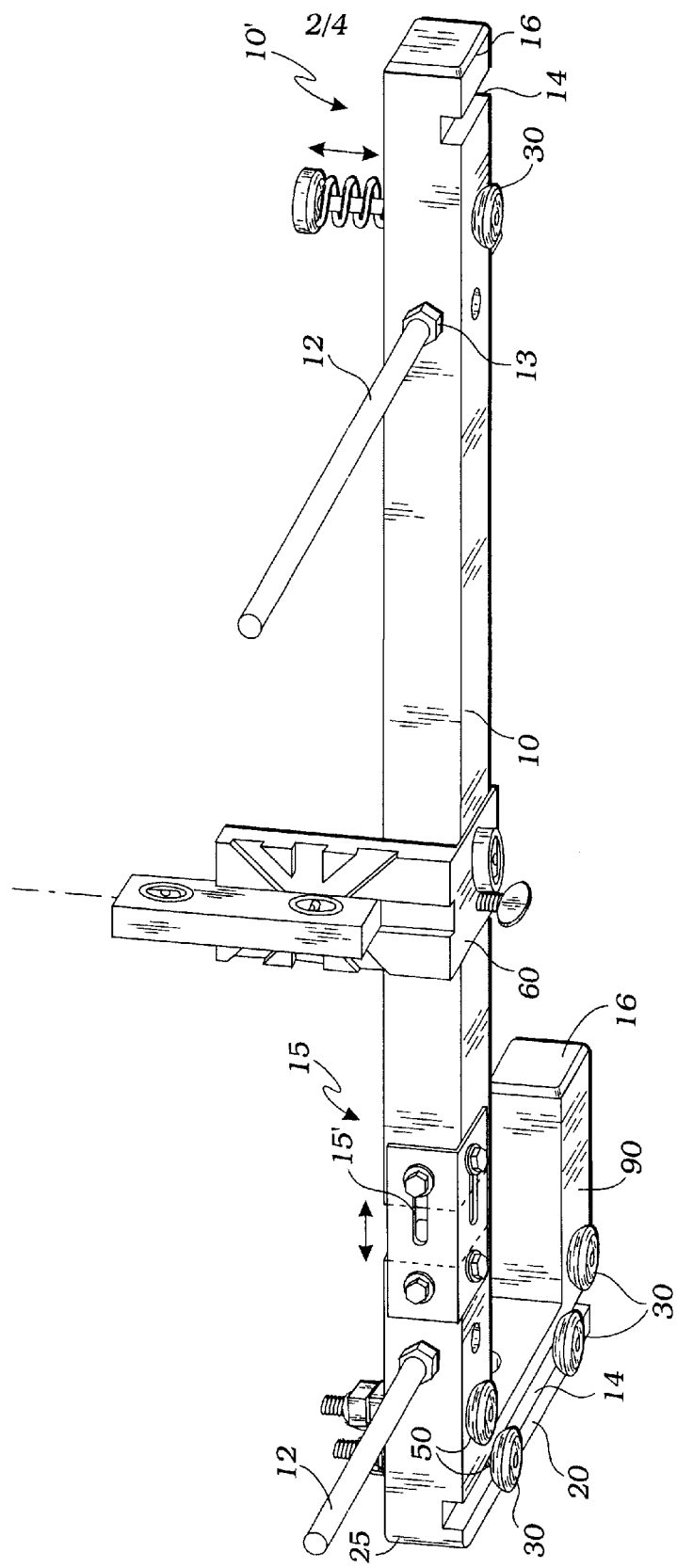
FIG. 2 is a perspective view of the article of FIG. 1 shown engaged level indicating device.

The linear U-shaped frame further comprising a pair of parallel slots 14 therein, the slots spaced apart for engaging a pair of the T-bars 5 of the dropped ceiling T-bar matrix. This is shown in FIG. 4. Preferably, a means for adjusting the length 15 of at least one of the legs so as to enable setting a selected distance between the parallel slots 14, is provided. As shown in FIGS. 1 and 2, such may be a simple support bracket with elongated holes 15' allowing linear adjustment.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for indicating position and angle comprising:
   a linear U-shaped frame comprising a pair of parallel legs joined by a cross leg, the cross leg and a terminal end of at least one of the pair of legs providing parallel slots therein, the slots spaced apart for engaging a pair of T-bars of a dropped ceiling T-bar matrix;
   plural adjustable feet, positioned for stably resting the apparatus on a surface at a selected angle relative to the horizontal;
   a support bracket adapted for rigid engagement with one of the legs and linearly positionable thereon;
   a laser beam source rotationally engaged with the support bracket for positioning a laser beam in a selected direction.

2. The apparatus of claim 1 wherein one of the pair of legs is longer than the other of the pair of legs, the support bracket engaged therewith.

3. The apparatus of claim 1 wherein each of the adjustable feet are threaded for screw adjustment enabling fine level control of the apparatus.

4. The apparatus of claim 3 wherein at least two of the feet are positioned apart at a distance necessary for clamping a pair of the T-bars of the dropped ceiling T-bar matrix.

5. The apparatus of claim 1 further comprising a means for attitude sensing held rigidly in the elongate frame, the attitude sensing means enabled for visually indicating when the frame has assumed a desired attitude.

6. The apparatus of claim 1 wherein the laser beam source is adapted for 360° rotation, and is further adapted for rigid positioning at any selected angle.

7. The apparatus of claim 6 wherein the rigid positioning adaptation is a spring-loaded pin positionable in any one of a plurality of selected locating holes.

8. The apparatus of claim 1 further providing at least one linear rod extending laterally from at least one of the arms for spacing the apparatus at a selected position set apart relative to a reference surface.

9. The apparatus of claim 1 further providing a means for adjusting the length of at least one of the legs so as to enable setting a selected distance between the parallel grooves.

10. The apparatus of claim 1 wherein one of said feet is mounted on a smooth shaft for free movement in a clearance hole, and further providing a spring for providing a clamping force between the one of said feet and an adjacent surface of one of the legs.

11. An apparatus for indicating position and angle comprising:

a linear U-shaped frame comprising a pair of parallel legs joined by a cross leg, the cross leg and a terminal end of at least one of the pair of legs providing parallel slots therein, the slots spaced apart for engaging a pair of T-bars of a dropped ceiling T-bar matrix;

plural adjustable feet, positioned for stably resting the apparatus on a surface in a true horizontal attitude;

a support bracket adapted for rigid engagement with one of the legs and linearly positionable thereon;

a receiver for fixedly receiving a commercial level indicating device, the receiver rotationally engaged with the support bracket for positioning the level indicating device in a selected direction.

12. The apparatus of claim 11 wherein one of the pair of legs is longer than the other of the pair of legs, the support bracket engaged therewith.

13. The apparatus of claim 11 wherein each of the adjustable feet are threaded for screw adjustment enabling fine level control of the apparatus.

14. The apparatus of claim 13 wherein at least two of the feet are positioned apart at a distance necessary for clamping a pair of the T-bars of the dropped ceiling T-bar matrix.

15. The apparatus of claim 11 further comprising a means for attitude sensing held rigidly in the elongate frame, the attitude sensing means enabled for visually indicating when the frame has assumed a desired attitude.

16. The apparatus of claim 11 wherein the receiver is adapted for 360° rotation, and is further adapted for rigid positioning at any selected angle.

17. The apparatus of claim 11 further providing at least one linear rod extending laterally from at least one of the arms for spacing the apparatus at a selected position set apart relative to a reference surface.

18. The apparatus of claim 11 farther providing a means for adjusting the length of at least one of the legs so as to enable set a selected distance between the parallel grooves.

19. The apparatus of claim 11 wherein one of said feet is mounted on a smooth shaft for free movement in a clearance hole, and farther providing a spring for providing a clamping force between the one of said feet and an adjacent surface of one of the legs.

* * * * *